Aug. 18, 1925.

N. M. NERONE

DIRIGIBLE LOCOMOTIVE HEADLIGHT

Filed Jan. 13, 1925

1,550,627

2 Sheets-Sheet 1

N. M. Nerone
INVENTOR

BY Victor J. Evans
ATTORNEY

Aug. 18, 1925.
N. M. NERONE
1,550,627
DIRIGIBLE LOCOMOTIVE HEADLIGHT
Filed Jan. 13, 1925      2 Sheets-Sheet 2
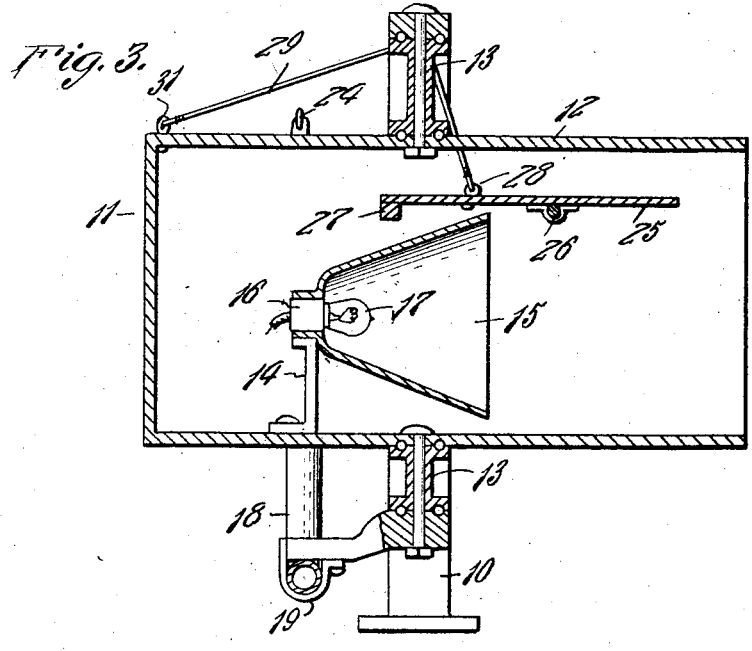
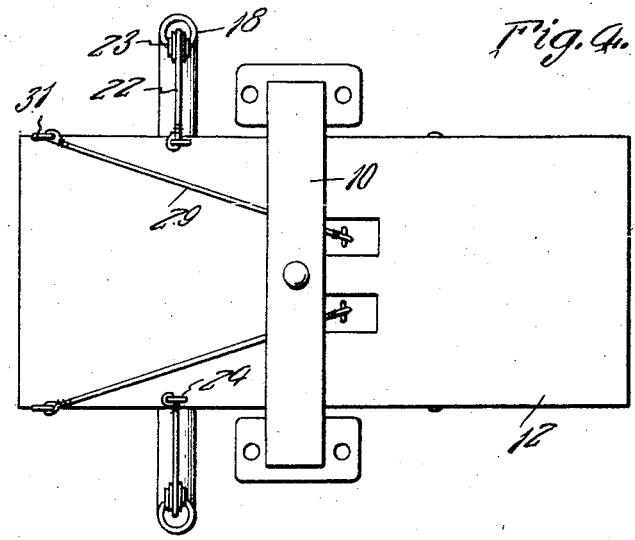
N.M.Nerone
INVENTOR
BY Victor J. Evans
ATTORNEY Patented Aug. 18, 1925.

1,550,627

UNITED STATES PATENT OFFICE.

NICK MICHELE NERONE, OF COALCREEK, COLORADO.

DIRIGIBLE LOCOMOTIVE HEADLIGHT.

Application filed January 13, 1925. Serial No. 2,193.

*To all whom it may concern:*

Be it known that I, NICK MICHELE NE-RONE, a citizen of the United States, residing at Coalcreek, in the county of Fremont and State of Colorado, have invented new and useful Improvements in Dirigible Locomotive Headlights, of which the following is a specification.

This invention relates to headlights for locomotives and has for its object the provision of a headlight mounting so constructed and arranged that the light will be turned automatically to throw the rays of light upon the track when the locomotive travels round a curve, means also provided for deflecting the light downwardly onto the track and providing much better illumination than is ordinarily possible.

An important object is the provision of a structure of this character which is operated by the tilting of the locomotive in going around a curve, it being well known that the inside rail is lower than the outside rail so that the locomotive will lean to one side or the other when making a turn.

An additional object is the provision of a device of this character which will be simple and inexpensive in manufacture, easy to install, positive in action, efficient and durable in service, and a general improvement in the art.

Figure 1:
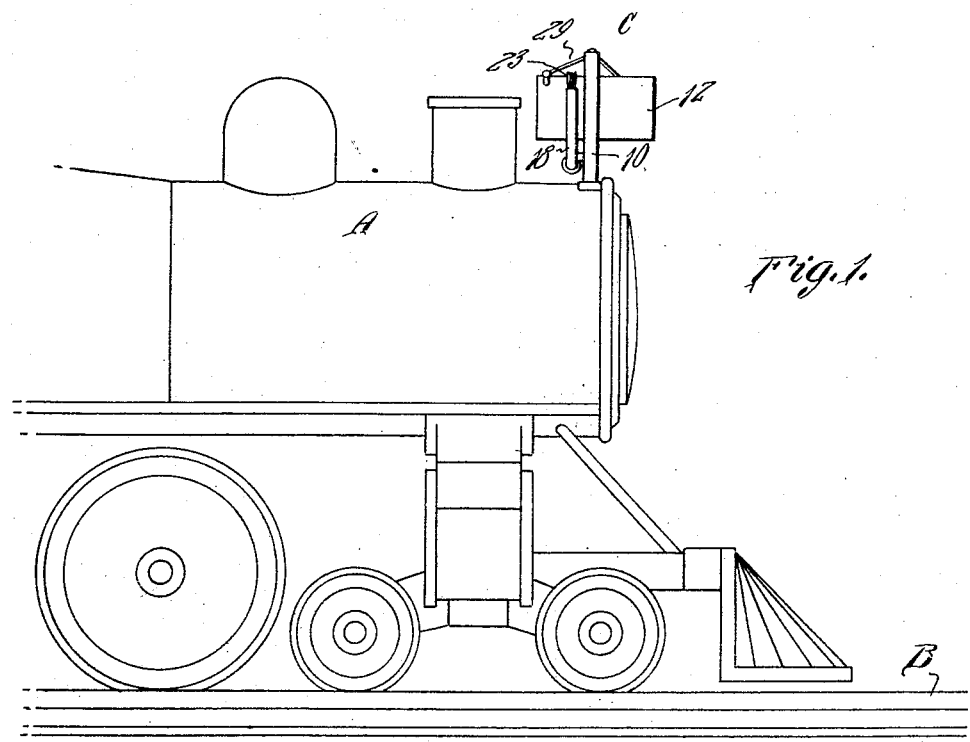
Figure 2:
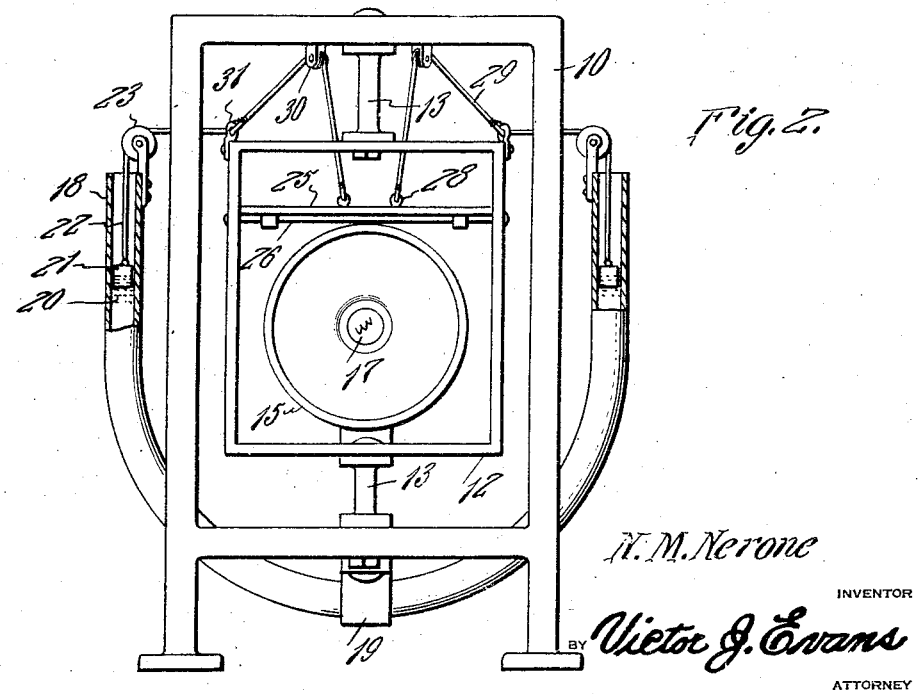

With the above and other objects and advantages in view, the invention consists in the details of construction to be hereinafter more fully described and claimed, and illustrated in the accompanying drawings, in which:

Figure 1 is a side elevation of a portion of a locomotive showing my headlight structure mounted thereon, Figure 2 is a front elevation of the headlight structure alone with parts broken away and in section, Figure 3 is a vertical longitudinal section through the headlight, and Figure 4 is a plan view thereof.

Referring more particularly to the drawings, the letter A designates a locomotive travelling upon track B, and C represents, generally, the headlight structure which is mounted upon the locomotive as the usual or any other preferred location.

In carrying out the invention, I provide an upright substantially rectangular frame member 10 having suitable means whereby it may be mounted upon the locomotive. Located within this frame is the lamp structure designated broadly by the numeral 11 and including a suitable casing 12, pivoted for movement in a horizontal plane by means of the pivot 13 located at the top and bottom of the frame 10. Within this casing 12 is a bracket 14 carrying a reflector 15 at the center of which is mounted a socket 16 carrying an incandescent bulb 17. Obviously any other type of illuminating means may be provided if preferred so long as the general structure is not altered.

The tilting means for the casing 12 comprises a U-shaped tube or pipe 18 suitably mounted on the frame 10 as for instance by means of the clips or clamps 19 and containing liquid indicated at 20. Arranged within the opposite arms of this U-shaped tube or pipe are floats 21 with which are connected cords or other flexible members 22 trained over guide pulleys 23 and connected with opposite sides of the casing 12 as shown at 24. Obviously, when the locomotive tilts to one side or the other the liquid 20 within the tube 18 will be correspondingly moved and the floats will be moved so that the tension on the flexible members 22 will be such as to pull the casing 12 laterally so that the light will follow the curvature of the track.

An additional feature is the provision of means for deflecting the light downwardly when the locomotive is rounding a curve in order that the track will be more brilliantly illuminated. In bringing out this part of the invention, I provide a deflector plate 25 which is suitably pivotally mounted within the casing 12 as for instance upon a rod or spindle 26. The rear end of this plate is preferably weighted as indicated at 27 so that it will normally remain in a substantially horizontal position in non-obstructing relation to the light emitted from the illuminating means. Connected with the rear portion of the plate 25 as indicated at 28 are suitable flexible members such as cords or the like trained over guide pulleys mounted on the under side of the top of the frame 10 and connected with the rear corners of the casing 12 as shown at 31.

In the operation of this feature, it will be evident that when the locomotive tilts to one side or the other in making a turn and the casing 12 swings laterally, there will be a tension exerted upon one of the flexible members 29 tending to shorten it and the result will be that the deflector plate 25 will be tipped forwardly and downwardly so that the light issuing from the reflector will strike against the plate 25 and be deflected downwardly onto the track.

From the foreging description and a study of the drawings it will be apparent that I have thus provided a sinply constructed, inexpensive and yet highly efficient headlight structure for locomotives in which it is insured that the light will follow curved tracks instead of going straight ahead as is the case with the ordinary stationarily mounted headlamps. It is obvious that the device will greatly aid the engineer inasmuch as he will have a proper view of the track at all times.

While I have shown and described the preferred embodiment of the invention, it is to be understood that I reserve the right to make such changes in the form, construction and arrangement of parts as will not depart from the spirit of the invention or the scope of the subjoined claims.

Having thus described the invention, I claim:

1. In a dirigible headlamp for locomotives, a stationary frame, a lamp casing pivoted within the frame for horizontal swinging movement and means responsive to tilting of the locomotive in one direction or the other when passing over a curved track whereby to effect swinging movement of the casing, and means responsive to lateral swinging of the lamp casing for deflecting the light downwardly, said means comprising a vertically swingable deflector plate pivotally mounted within the casing, and flexible members connected with said plate in spaced relation to the pivot points thereof, trained over guides carried by the frame and connected with the rear portion of the casing.

2. In a dirigible headlamp for locomotives, a stationary frame, a lamp casing pivoted within the frame for horizontal swinging movement, and means responsive to tilting of the locomotive in one direction or the other when passing over a curved track whereby to effect swinging movement of the casing, said means comprising a U-shaped pipe member carried by the frame and containing liquid, floats located within the arms of the U-shaped pipe member in engagement with the liquid and movable in accordance with tilting thereof, and flexible members connected with said floats and connected with opposite sides of the casing at points spaced from the pivots thereof, a vertically swingable plate pivoted within the casing, and flexible members connected with said plate, trained over stationary guides carried by the frame and connected with the rear corners of the casing.

In testimony whereof I affix my signature.

NICK MICHELE NERONE.